United States Patent
Yoo

[15] 3,679,772
[45] July 25, 1972

[54] CHEMICAL PROCESS

[72] Inventor: Jin S. Yoo, South Holland, Ill.

[73] Assignee: Atlantic Richfield Company, New York, N.Y.

[22] Filed: Aug. 4, 1969

[21] Appl. No.: 847,447

[52] U.S. Cl. ................260/680 B, 252/430, 260/666 B, 260/677 R
[51] Int. Cl. .................C07c 3/10, C07c 11/12
[58] Field of Search................260/680 B

[56] References Cited

UNITED STATES PATENTS

| | | | |
|---|---|---|---|
| 3,565,967 | 2/1971 | Collette et al. | 260/680 |
| 3,592,869 | 7/1971 | Cannell | 260/683.15 |
| 3,096,385 | 7/1963 | McConnell et al. | 260/683.15 |
| 3,306,948 | 2/1967 | Kealy | 260/680 |
| 3,459,826 | 8/1969 | Barnett et al. | 260/683.15 |
| 3,483,269 | 12/1969 | Magoon et al. | 260/683.15 |
| 3,507,930 | 4/1970 | Herwig | 260/680 |

Primary Examiner—Paul M. Coughlan, Jr.
Attorney—Thomas J. Clough, Blutcher S. Thorp and Frank J. Uxa

[57] ABSTRACT

Reaction of a mono-olefin and a conjugated olefin in contact with a catalyst comprising a complex of nickel, a Group V-A electron donor ligand and a non-protonic Lewis acid and reducing agent on a solid, acidic silica-based support. Illustrative is the preparation of 1,4-dienes from the reaction of 1,3-butadiene and ethylene in contact with nickel acetylacetonate, triphenylphosphine, and ethylaluminum-sesquichloride supported on silica-alumina pellets.

21 Claims, No Drawings

3,679,772

CHEMICAL PROCESS

BACKGROUND OF THE INVENTION

1. Field of the Invention

This invention relates to a novel process for reacting mono-olefins with conjugated olefins and, in particular, conjugated di-olefins. In particular, this invention relates to the selective synthesis of 1,4-dienes from the reaction of mono-olefins with conjugated dienes, and specifically from the reaction of 1,3-butadiene with ethylene.

2. Description of the Prior Art

The subject invention provides a process for the selective synthesis of 1,4-dienes and, in particular, 1,4-hexadiene, from the reaction of 1,3-butadiene and ethylene using a ternary nickel catalyst system as hereinafter more fully described. Such systems have previously been known to effectively codimerize mono-olefins of widely differing reactivities, such as butene and propylene, but their use in the selective codimerization of conjugated dienes with mono-olefins is novel. Furthermore, the discovery that such catalyst systems make feasible the continuous production of 1,4-hexadienes or 1,4-$C_8$-dienes from 1,3-butadienes and ethylene in a conventional fixed reactor, is an important contribution to petrochemical technology. 1,4-Hexadiene, which is a non-conjugated isomer, is extremely useful, for example, as a third component to give vulcanizable properties to ethylene-propylene polymer rubber.

SUMMARY OF THE INVENTION

It has been found that a process which comprises contacting a mono-olefin and a conjugated olefin, particularly a conjugated di-olefin, with a solid phase catalyst composition comprising a nickel electron donor ligand complex of organic substituted elements of Group V-A of the Periodic Table, having an atomic weight of 15 to 83, when combined with a non-protonic Lewis acid capable of forming a coordination bond with said metal, and with a reducing agent capable of reducing nickel acetylacetonate to an oxidation state of less than 2, on a solid, acidic silica-alumina support, as described more fully hereinafter, provides non-conjugated dienes in good yields. Exemplary is the reaction of 1,3-butadiene with ethylene in the presence of a catalyst prepared from nickel acetylacetonate, triphenylphosphine, and ethylaluminum sesquichloride to produce 1,4-dienes. The activity of the present catalyst is extraordinarily high so that the reaction occurs under unusually mild conditions. Neither elevated temperature nor pressure is required, although more rapid induction may make initial heating and pressurizing desirable.

DETAILED DESCRIPTION OF THE INVENTION

In accordance with this invention, the nickel source is provided by compounds of nickel which are at least slightly soluble in some solvent wherein the nickel Group V-A ligand complex can be formed. Preferred are the weak field ligand complexes, the ligands of which can be readily exchanged.

In the preparation of the catalyst of the present invention a suitable nickel source is provided. Exemplary of such sources are halides, e.g., $NiCl_2$, $NiBr_2$, $NiI_2$; alkoxy derivatives, e.g., $Ni(OR)_2$, where R represents alkyl, aryl, aralkyl, and the like, groups; alkoxy metal carboxylates, e.g., (RO)NiOOCR', where R and R' are as defined above for R; diphosphine complexes, e.g., $Ni[(C_6H_5)_2PC_2H_4P(C_6H_5)_2]X_2$, where X is a halide. Also available as metal sources are chelates formed by nickel and weak fields ligands, such as $\beta$-diketones or $\beta$-ketocarboxylic acid esters and salts of carboxylic acids. Examples of these types of metal source include $\beta$-diketonato nickel(II), acetylacetonato nickel(II), propylacetonato nickel(II), benzoylacetonato nickel; chelates from $\beta$-ketocarboxylic acid esters; salts of saturated and unsaturated monocarboxylic acids, e.g., nickel formate, nickel phenylpropionate, and the like; salts of corresponding unsaturated monocarboxylic acids, e.g., nickel acrylate nickel acetate, and the like; nickel salts of saturated dicarboxylic acids, e.g., nickel adipate, nickel decane-1,10-dicarboxylate, and the like; like salts of corresponding unsaturated dicarboxylic acids, e.g., nickel muconate, and the like; nickel salts of cyclic and aromatic carboxylic acids, e.g., nickel benzoate, nickel phthalates, and the like; and dialkoxycarboxylates, e.g., nickel dimethoxyacetate, and the like. (In the foregoing discussion it is preferred that R and R' be lower-alkyl, e.g., one to six carbons or, when aryl, contain no more than about ten carbons).

The electron donor ligand component can be a hydrocarbon substituted organophosphine, particularly monotertiary phosphines, $R_3P$, where R can be alkyl or phenyl and contains from 1 to about 20 carbon atoms and can be substituted with non-deleterious groups. Preferably R is devoid of olefinic or acetylenic unsaturation. A preferred ligand component is tri-n-butylphosphine. Other phosphorous-containing compounds such as $P(OR)_3$, $P(OC_6H_4C_6H_5)_3$, or ditertiary phosphines of the type $R_2P(CH_2)_nPR_2$ and $R_2PCH=CHPR_2$ where R is as defined above and $n = 1, 2, 3,$ or 4 can be employed. Other Group V-A electron donor ligands can also be used, including for example, tertiary and ditertiary arsines, stibines, and bismuthines; alkyl or arylphosphites and phosphine oxides; phosphorous and organophosphorous chlorides; nitrogenous chelate ligands, e.g., 2,2'-dipyridyl, ethylenediamine, pyridine, 1,10-phenanthroline, 8-aminoquinone, Shiff base ligands and the like; ligands containing phosphine and amine values, e.g., diethylaminoethyldiphenylphosphine, bis(diethylaminoethyl)phenylphosphine, and the like.

The Lewis acid and the reducing agent functions are preferably supplied by an organoaluminum compound, although, as discussed below, other organometallic compounds can be employed. Exemplary of organoaluminum compounds are trialkylaluminum, dialkylaluminum halide, alkylaluminum halide, alkylaluminumsesquihalide, alkoxydialkylaluminum, dialkylaluminumhydride, and the like. wherein the alkyl and alkoxy groups contain from one to about 20 carbons and, preferably, are lower-alkyl or lower-alkoxy containing from one to about six carbons and the halide is generally chloride, bromide, or iodide, preferably chloride, although all halides are intended. The following formulas further exemplify the aluminum compounds of this invention: $R_3Al$, $R_yAlX_{3-y}$, $R_2AlH$, $MAlR_4$, and $R_3Al_2X_3$; wherein R is alkyl or alkoxy, as defined above; M is an alkali metal, preferably sodium or lithium; X is halide, preferably chloride, and $y$ is one or two. (The organoaluminum halide reducing agents can also be formed in situ by interaction of an alkylaluminum and aluminum halide). The following typify such aluminum compounds: triethylaluminum, tri(n-propyl)aluminum, tri(isopropyl)-aluminum, tri(n-hexyl)aluminum, tridecylaluminum, ethoxydiethylaluminum methoxydiethylaluminum, ethoxydiisobutylaluminum, phenoxydiisobutylaluminum, triphenylaluminum, butoxydihexylaluminum, lithiumtetraethylaluminum, sodiumtetraethylaluminum, and the like. Other organometallic compounds, wherein the metal is preferably a Group II-A, II-B, III-A, III-B or IV-A metallic element of the Periodic Table of the Elements, which can be employed as substitutes for the aluminum are typified by the following formulas RLi, $R_2Be$, RBeH, $MeBeR_3$, $R_2Mg$, $R_4Pb$, $R_4Sn$, and $R_2Hg$. (In the foregoing formulas, R is as defined for the aluminum compound formulas). Grignard reagents can also be utilized.

Where the particular reducing agent employed in the composition does not exhibit sufficient Lewis acid strength, it is necessary to separately supply the Lewis acid to the catalyst composition. The reducing agent must be compatible with the Lewis acid and be capable of reducing the nickel, preferably to an oxidation state lower than one and even to zero. In cases where the reducing agent does not function as a Lewis acid of sufficient strength, the additional Lewis acid component is supplied by a compound which is other than protonic or hydrogen acid and which is capable of receiving one or more pairs of electrons to form a coordinate-covalent bond. Lewis acids are well known to the art and are fully defined, for example, by Noller, Chemistry of Organic Compounds, W. B. Saunders (1951) ) at pages 233–235; by Stone, Chemical Reviews (1958) at page 101; and by G. N. Lewis, Journal of the Franklin Institute, 226–293 (1938). Examples of Lewis acids which are not included as a component of a compound which does not serve as a reducing agent include boron-trifluoride, boron-trifluoride etherates, e.g., diethyletherate, aluminum trihalides, zinc halides, and stannic halides.

The amount of nickel in the silica-based support in the catalyst of this invention is a minor amount effective to enhance the desired olefin polymerization and often ranges from about 0.05 or 0.1 weight percent up to about 15 or more weight percent, and is preferably about 0.3 to 5 weight percent of the support. The molar ratios of the electron donor ligand to the nickel in the catalyst is often about 0.5 to 20:1, preferably about 1 or 3 to 10:1 or even about 3 to 5:1. The amount of the Lewis acid-reducing agent, e.g., ethylaluminum sesquichloride, can vary with the ratio of electron donor ligand-to-nickel; generally the minimum amount preferred increases as the ligand is increased when producing a black amorphous catalyst form. The Lewis acid-reducing agent component is generally required in a minimum mole ratio to nickel of about 3:1 and, to obtain a black amorphous catalyst form, the ratio is at least about 3:1 when the ligand-to-nickel mole is about 3:1, ranging up to a minimum of about 12:1 when the ligand-to-nickel ratio is about 10:1. The Lewis acid-reducing agent will not ordinarily be utilized in the catalyst in a mole ratio of such agent to nickel of greater than about 60:1, preferably the ratio is about 5 to 20:1. In a preferred embodiment, the catalyst of the present invention comprises a black amorphous solid phase of nickel acetylacetonate, and, per mole of nickel, about 3 to 10 moles of tri-n-butylphosphine and about 3 to 40 moles of ethylaluminum sesquichloride.

The solid support of the catalyst of the present invention is an acidic, silica-based material, e.g., having a D=L activity of at least about 20, preferably at least about 30 when determined according to the method of Birkhimer et al., "A Bench Scale Test Method for Evaluating Cracking Catalysts," Proceedings of the American Petroleum Institute, Division of Refining, Vol. 27 (III), page 90 (1947), and hereinafter referred to as Cat A. The silica-based support preferably has a substantial surface area as determined by the BET nitrogen absorption procedure (JACS, Vol. 60, pp. 309 et seq.) (1938). The surface area of the support can be at least about 50 square meters per gram, and such surface areas are often up to about 500 or more $m^2/gm.$, preferably about 150 to 400 $m^2/gm$. It is preferred that the catalyst support be relatively dry to avoid undue reaction with and loss of catalytic promoting materials. Thus it is advantageous that the support be calcined, e.g., at temperatures of about 600° to 1500° F. or more, to reduce the water content, but such calcination should not be so severe that the support is no longer catalytically-active.

The support component contains other materials in addition to silica which materials, when combined with silica, provide an acidic material as in, for instance, the case of silica-alumina. Often these materials are one or more oxides of the metals of Groups II, III and IV of the Periodic Table. Examples of the composites contemplated herein under the generic designation of silica-based materials are often composed predominantly of, or even to a major extent of, silica. These supports include, for example, silica-alumina, silica-boria, silica-zirconia, silica-magnesia, silica-alumina-zirconia, silica-alumina-thoria, silica-alumina-magnesia, and the like. The silica-based support can contain amorphous or crystalline material such as a crystalline aluminosilicate, for instance, having pore openings in the 6 to 15 Angstrom unit range. The support often contains silica and alumina and such supports, whether naturally-occurring as in acid-treated clays, or a synthetic gel, will frequently contain about 10 to 60, preferably about 15 to 45, weight percent alumina. In addition, such silica-alumina supports can, and preferably do, contain a portion of the alumina as a separate distinct phase.

A highly preferred catalyst support can be made by combining a silica-alumina hydrogel with a hydrous alumina with or without (preferably without) a crystalline alumino-silicate. An advantageous hydrous alumina component is, when analyzed by X-ray diffraction of dry samples, either one or a mixture of amorphous hydrous alumina and a monohydrate, e.g., boehmite, of less than about 50 A., preferably less than about 40 A., crystallite size as determined by half-width measurements of the (0, 4, 1) X-ray diffraction line calculated by the Debye-Scherrer equation. The mixture of the catalyst precursor components can be dried, e.g., at about 220° to 500° F. to convert the silica-alumina hydrogel to xerogel form. The dried material can then be calcined, e.g., at a temperature of about 700° to 1500° F., preferably about 800° to 1400° F., to provide the active catalyst support. During calcination, the separate hydrous alumina phase of the mixture is converted to a gamma form or other catalytically-active alumina.

In providing the preferred catalyst support precursor for drying, the components can be combined in any suitable manner or order desired, and advantageously each of the components is in the mixture in finely-divided form, preferably the particles are principally less than about 300 mesh in size. The finely-divided material can have an average particle size of about 10 to 150 microns and can be used to make a catalyst of this particle size which can be employed in a fluidized bed type of operation. However, if desired, the mixture of catalyst support components can be placed in macrosized form, that is, made into particles as by tabletting, extruding, etc., to sizes of the order of about 1/64 to ½ inch or more in diameter and about 1/32 to 1 inch or more in length, before or after drying or calcination. If formation of the macrosized particles is subsequent to calcination and the calcined particles have been contacted with water, the material can be recalcined.

On a dry basis, the preferred supports of the catalysts of the present invention contain about 45 to 95 weight percent of the amorphous silica-alumina xerogel, about 5 to 55 weight percent of the separately added alumina phase, and about 0 to 50 weight percent of the crystalline alumino-silicate, preferably the proportions of these ingredients are about 75 to 90 percent, about 10 to 25 percent and about 0 to 20 percent, respectively. If present, the crystalline aluminosilicate is usually at least about 1 weight percent, preferably at least about 5 weight percent, based on the dried support. The alumina content from the silica-alumina xerogel and the separate alumina phase is about 20 to 70 weight percent, preferably about 25 to 60 weight percent, based on the dried support. Also, the catalyst support generally contains less than about 1.5 weight percent, preferably less than about 0.5 weight percent, sodium.

The silica-alumina component of the precursor of the preferred catalyst support of the present invention can be a silica-alumina hydrogel which contains about 55 to 90, preferably 65 to 75, weight percent silica and about 10 to 45, preferably about 25 to 35, weight percent alumina, on a dry basis. The silica-alumina can be naturally-occurring or can be synthetically prepared by any desired method and several procedures are known in the art. For instance, an amorphous silica-alumina hydrogel can be prepared by coprecipitation or sequential precipitation by either component being the initial material with at least the principal part of the silica or alumina being made in the presence of the other. Generally the alumina is precipitated in the presence of a silica gel. It is preferred that the silica-alumina hydrogel be made by forming a silica hydrogel by precipitation from an alkali metal silicate solution and an acid such as sulfuric acid. Then alum solution may be added to the silica hydrogel slurry. The alumina is then precipitated by raising the pH into the alkaline range by the addition of an aqueous sodium aluminate solution or by the addition of a base such as ammonium hydroxide. Other techniques for preparing the silica-alumina hydrogel are well known in the art, and these techniques may be used in the practice of the invention.

The alumina hydrogel which can be combined with the silica-alumina is made separately from the silica-alumina. The alumina hydrogel may be prepared, for example, by precipitation of alumina at alkaline pH by mixing alum with sodium aluminate in an aqueous solution or with a base such as soda ash, ammonia, etc. As noted above, the alumina hydrogel can be in the form of amorphous hydrous alumina or alumina monohydrate, e.g., of up to about 50 A. crystallite size as determined by X-ray diffraction analysis. The amorphous hydrous alumina generally contains as much combined water as does an alumina monohydrate. Mixtures of the monohydrate and amorphous forms of hydrous alumina are preferred and often this phase is composed of at least about 25 percent of each of the separate members.

In preparing the catalyst support, we may separately filter the silica-alumina hydrogel and the hydrous alumina and intimately mix these materials, for instance, by colloidal milling. Although in this particular procedure a low sodium crystalline aluminosilicate can be added after the milling, this ingredient can also be combined before the colloidal milling operation. The mixture is dried, water washed to acceptable concentrations of, for instance, sodium, and redried in the preferred procedure. The drying, especially the initial drying, is advantageously effected by spray drying to give microspheres.

The crystalline aluminosilicate which can be present in catalyst support of the present invention, can have pore openings of 6 to 15 A. in diameter, and preferably the pore openings have a diameter of 10 to 14 A. Usually, with a given material, the pores are relatively uniform in size and often the crystalline aluminosilicate particles are primarily less than about 15 microns in size, preferably less than about 10 microns. In the crystalline aluminosilicate the silica-to-alumina mole ratio is often greater than about 2:1 and is usually not above about 12:1, preferably being about 4 to 6:1. The aluminosilicate may be available in the sodium form, and the sodium can be removed before or after the crystalline aluminosilicate is added to the other catalyst support ingredients.

It is preferred to exchange the sodium with ammonium ions, for instance, through contact with an aqueous solution of ammonium chloride or another water-soluble ammonium compound. Subsequently, during drying and/or calcination, the ammonium ion may break down to release ammonia and leave an acid site on the aluminosilicate. On a molar basis, the ammonium or hydrogen ion is usually at least about 10 percent or even at least about 50 percent, based on the alumina content of the crystalline aluminosilicate. Suitable replacements for the sodium also include the polyvalent metals of the periodic chart, including the Group II-$a$ and rare earth metals such as cerium, etc. The metals may be present along with the ammonium or hydrogen cations.

The order in which components are combined to prepare the supported catalyst of the present invention can be varied. The catalysts can be conveniently prepared by impregnating the silica-based support material with a solution of the nickel component, e.g., nickel acetylacetonate, in a solvent, e.g., methanol. The nickel-impregnated support after solvent removal is then preferably sequentially contacted with a solution of the electron donor ligand component, e.g., tri-n-butylphosphine, and then the reducing agent and Lewis acid component or components, e.g., aluminum sesquichloride.

Although the foregoing is a preferred method for preparing the catalyst of this invention, the nickel complex can first be prepared for subsequent impregnation into the silica-based support. The preparation of the unsupported nickel complex can be conducted by first forming the complex of the electron donor ligand and the nickel source and then adding to a solution or suspension of that complex, in a suitable organic solvent, the reducing agent and the Lewis acid. Suitable organic solvents are those which are inert to the catalyst and which will not enter into, or deleteriously affect, the eventual dimerization or oligomerization reaction. As specific examples thereof may be mentioned aromatic and aliphatic hydrocarbons and their halogenated, e.g., chlorinated, derivatives. Oxygen-containing solvents are generally to be avoided for this purpose.

Formation of the ligand-nickel complex may be effected by simply mixing the two reactants in the presence of a suitable solvent for the complexing reaction. The mixing can be done at room temperature or up to as high as about 300° F. The complex usually forms within about 30 to 120 minutes. Suitable solvents for the complex-forming reaction include the same solvents which are suitable for use in making the catalyst composition containing the Lewis acid-reducing agent. If desired, however, the complexing may be accomplished in a solvent which is unsuitable for use in making the latter composition; in this case the resultant complex can be first isolated from the reaction mixture and re-dissolved, or re-suspended, in a proper solvent which is inert to the catalyst composition containing the Lewis acid-reducing agent.

Thus, for example, one method of preparing a phosphine-nickel complex can involve stirring or refluxing, preferably at elevated temperature, a mixture of tri-n-butylphosphine, nickel acetylacetonate and chlorobenzene. After the solid green complex has been formed there may then be added directly to the reaction mixture the reducing agent and Lewis acid. In another method the complex may be prepared by refluxing an alcohol, e.g., ethanol, solution of the phosphine, say tri-n-butylphosphine, and nickel acetylacetonate, preferably at a temperature of about 150° to 250° F., and isolating the resultant complex from the reactant mixture. This approach is often preferred where the nickel reagent contains some water of hydration, as the water will be removed from the complex when the latter is separated from the alcohol solvent. The isolated complex can then be dissolved or suspended in a suitable inert solvent, e.g., chlorobenzene, and the reducing agent and Lewis acid added thereto to form the complex of the catalyst composition of the present invention. The addition to the complex solution of the reducing agent and Lewis acid is preferably conducted in a dry-inert atmosphere (argon or nitrogen), out of the presence of air, for instance, in an autoclave. Within a relatively short period of time after the admixing of the components, e.g., about 5 to 15 minutes, the catalyst complex is formed, preferably as a colloidal precipitate suitable for impregnating the silica-based supports of this invention.

The supported catalyst compositions of the present invention are effective for codimerization, co-oligomerization, or co-polymerization of mono-olefinic hydrocarbons with diolefins of the conjugated type, and are highly desirable for such uses. These catalysts are exceptionally well suited for the preparation of the non-conjugated 1,4-dienes by a catalytic reaction of conjugated dienes with mono-olefins of two to about eight, preferably about two to four, carbon atoms, and in particular, exhibit very long catalytic activity for the preparation of 1,4-dienes from 1,3-butadienes or 1,3-pentadienes with ethylene, propylene, butylenes, etc. In the latter cases the present supported catalyst, therefore, allows the production of 1,4-hexadienes from 1,3-dienes and mono-olefins continuously through very simple conventional operations known for usual heterogeneous catalyst systems. 1,4-Hexadiene, 3-methyl-1,4-hexadienes, and 2-methyl-1,4-hexadiene were produced from 1,3-butadiene with ethylene, 1,3-pentadiene with ethylene, and 1,3-butadiene with propylene, respectively, in very high selectivities and high conversions. With the cobalt catalyst 3-methyl-1,4-heptadiene was also formed in significant yields from the reaction of 1,3-butadiene and ethylene, in addition to 1,4 -hexadiene.

Hexadienes are very useful products for commercial purposes. 1,4-Hexadiene, which is a non-conjugated isomer, is extremely useful as a third component to give vulcanizable properties to ethylene-propylene polymer rubber.

The conjugated diene hydrocarbons which can be reacted in accordance with the present invention include those of four to about 12 carbon atoms, especially the aliphatic dienes of four to about eight carbon atoms, such as the butadienes and pentadienes. Substituted 1,3-dienes can be used as a conjugated diene reactant. Alkyl groups, whose number of carbon atoms ranges from one to eight, can be employed as substituent groups. Considering the usefulness of the products formed from the diene reactant, the side groups which have carbon number one –six are more desirable. These compounds are generally described as 2-alkyl-1,3-butadienes, 1-alkyl-1,3-butadienes, 2,3-dialkyl-1,3-butadienes, and 2-phenyl-1,3-butadiene. Consequently, the 1,4-hexadienes, which can be produced with the present supported catalyst, are, for example, 5-alkyl-1,4-hexadienes, 4-alkyl-1,4-hexadienes, 3-alkyl-1,4-hexadienes, and 6-alkyl-1,4-hexadienes (wherein the alkyl substituent contains one to eight and preferably one to six carbons) by appropriate combination of diene and mono-olefin reactants.

Copolymerization can generally be effected by contacting the olefinically-unsaturated feed at a temperature of about 0° to 200° F., preferably about 50° to 100° F. to 175° F., which ordinarily can be maintained by the heat of reaction without external heating means. It may be necessary to control the temperature by cooling, as for example, by circulating a cooling medium through heat exchange tubes in the reactor. Pressures of up to about 1000 psig, preferably about 200 to 1000 psig, are suitable with the catalyst composition of the present invention. The amount of catalyst composition used in the reaction is that sufficient to effect codimerization or oligomerization of the feed and often is about one to about 20, preferably 1–10, WHSV of catalyst composition (not including the solvent therefor) based on the weight of hydrocarbon feed.

The preparation of an acidic silica-alumina support of this invention is illustrated by Examples I-III and the support contains a separate phase of alumina.

EXAMPLE I

An alumina hydrogel is prepared as follows:

In a tank containing 5700 gallons of water at 85° F, are dissolved 300 lbs. of soda ash. When the soda ash has been dissolved, 180 gallons of a 39 percent concentration aqueous sodium aluminate solution are pumped into the tank in about a 15 minute period. The contents of the tank are at about 84° F. Six-hundred gallons of aqueous aluminum sulfate of 7.8 percent concentration, as $Al_2O_3$, are added to the admixture over an 80 minute period with water of dilution in conjunction with, and in addition thereto, diluting the reaction mass at a rate of 25 gallons per minute.

The pH of the resulting aqueous reaction mass is adjusted to 8.0 with about 75 gallons of 39 percent concentration is also diluted continuously with water at a rate of 35 gallons per minute over a 7-½ minute addition period. The contents of the tank are heated to about 100° F, and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hydrogel is stripped from the drum. This hydrogel analyzes about 59 percent boehmite having a crystallite size of about 35 A, and 50 percent amorphous hydrous alumina as determined by X-ray diffraction on dried samples.

EXAMPLE II

A silica-alumina hydrogel is prepared by the following technique:

To a batch tank is added 4,275 gallons of water preheated to 90° F, and 865 gallons of sodium silicate solution (28.8 weight percent $SiO_2$, 40–41.5 Baume at 68° F, and $Na_2O:SiO_2$ ratio of 1:3.2) is added. The batch is stirred for five minutes. The concentration of the sodium silicate, as $SiO_2$, in the batch is 6.3 weight percent.

With the batch at 90° F, 302 gallons of 34.5 weight percent sulfuric acid solution at 182° F are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent as $Al_2O_3$) diluted in 1080 gallons of water is added over a period of 17 minutes. After all the sodium aluminate is added, the pH is checked. It should be between 5.0 and 5.2. The alumina content of the silica-alumina hydrogel is 30–31 percent.

EXAMPLE III

The silica-alumina hydrogel product of Example II and 1740 gallons of the alumina hydrogel filter cake of Example I are mixed together for one hour. The finished batch has a pH of 5.5 to 5.6 and a temperature of about 110° F. The aqueous gel mixture is then pumped to a dewatering filter and the filter cake from said dewatering filter and a portion of aqueous gel are blended to give a gel slurry of about 14 weight percent solids. A portion of this hydrogel mixture was slurried, as a thick flowable paste, with a "Lightnin" stirrer fitted with a cage-beater and a propellor, for about 10 minutes to give a thorough dispersion. The product was stirred one minute at 14,500 rpm, in a Waring Blender and dried in a laboratory spray-drier. The spray-dried material was washed with water to acceptable impurity levels and dried at 230° F. The washed and dried material analyzed 0.08 percent $SO_4$ and less than 25 ppm $Na_2O$. The dried material as such was used as the catalyst support, as were extruded forms thereof and tablets (pellets) having diameters of about ⅛ inch and lengths of about ⅛ to ½ inch. Before use the catalyst support calcined in a muffle furnace by raising the temperature by 300° F. per hour until 1350° F. was reached. This temperature was then held for three hours. The calcined particles had a surface area of about 320 to 340 square meters per gram.

The following Examples illustrate the cooligomerization of 1,3-butadiene and ethylene.

EXAMPLE IV

The catalyst prepared from 1.93 m moles nickel acetylacetonate, 3.78 m moles triphenylphosphine, and 16.7 m moles ethylaluminumsesquichloride was supported on 10.0 g. silica-alumina pellets (Example III). The resulting black solid catalyst pellets were transferred into a 300 cc stainless steel autoclave. Two runs were made with 1,3-butadiene and ethylene over a 23 hour period. The catalyst was aged during the intermittent period from the first run to the second under a mixed atmosphere of nitrogen and vapors of products and reactants at room temperature. In the first run, 62.7 g. 1,3-butadiene (100 ml) was introduced to the catalyst, and then addition of ethylene was followed immediately to a pressure of 500–600 psig. The system was allowed to react with vigorous agitation without applying heat for a seven-hour period. The reaction temperature was about 90°–100° F, indicating an exothermic reaction. A moderate pressure drop was observed during the first hour. Judging from the pattern of the pressure drop, it was believed that the reaction was complete within one to three hours, but the reaction was still allowed to proceed overnight (seven hours) under these conditions. A colorless liquid product was discharged from the reactor, and analyzed by gas-liquid chromatographic and mass spectroscopic techniques. The over-all conversion was 31.0 percent. The products were found to consist of 35 percent 1,4-hexadiene, 48 percent 3-methyl-1,4-heptadiene, 13 percent 3-ethyl-1,4-hexadiene, 2 percent 3-methyl-1,4-pentadiene and 2 percent octatrienes. A higher boiling component was composed of mainly cyclodimers of butadiene, i.e., 1,5-cyclooctadiene and 4-vinylcyclohexene, along with a small amount of higher oligomers. Usually, some conjugated dienes, such as 2,4- and 1,3-diene are believed to be present in the non-conjugated 1,4-$C_6$- and 1,4-$C_8$-dienes. The presence of small amounts of $C_8$-triene in the product was detected by mass spectroscopic analyses.

In the second run, 62.7 g. 1,3-butadiene (100 ml )was added to the same catalyst, which was aged for about 14 hours, and ethylene was continuously introduced at a pressure of 450–600 psig. The exothermicity of the reaction maintained the temperature of the system at about 90°–100° F. After a nine hour reaction under these conditions, a clear reaction mixture was removed from the reactor. 1,4-Hexadiene (27 percent), 3-methyl-1,4-heptadiene (57 percent) and 3-ethyl-1,4-hexadiene (11 percent) were found in the product. Total conversion of 1,3-butadiene was 47 percent. A higher boiling component (22 percent) composed predominantly of $C_8$-dienes was also present. Because a longer reaction period was used, the formation of $C_8$-dienes was predominant, and consequently the amount of $C_6$-dienes decreased. It is very interesting to note that the catalytic activity of the supported catalyst was maintained at an equal level through these runs over a 23 hour period.

EXAMPLE V

The black supported catalyst was prepared from 0.92 m moles nickel acetylacetonate, 2.24 m moles triphosphino and 9.1 m moles ethylaluminum sesquichloride with 10.0 g. silica-alumina pellets (Example III). Three consecutive runs were made with the resulting supported catalyst in a 300 cc stainless steel bomb over a 22 hour period. Periodic agitations were applied to the system during the reaction period in the first run. 46.8 g. 1,3-Butadiene (75 ml) was allowed to react with ethylene for two hours at a pressure range of 75–800 psig at 90–100° F. In the second run, 62.7 g. 1,3-butadiene (100 ml) was reacted with ethylene using the 2-½ hour aged catalyst for a 1-½ hour period under similar conditions. The temperatures of both the first and second runs were raised to 90°–100° F by the exothermicity of reaction. No heating was necessary. In the third run, ethylene was added to 47.0 g. 1,3-butadiene ( 75 ml) at a pressure of 800 psig for 30 minutes. At this stage the catalyst was aged for 20 hours. The whole system was submerged in an oil bath, whose temperature was set to 150° F. The pressure of the system built up to 1200 psig under these conditions. Reaction was continued for a two hour period, and about 18.0 g. of the product was obtained. No effort was made to analyze the product obtained in the third run.

In the first and second run, a fairly large amount of 2,4-dimethyl-1,4-hexadiene (6–8 percent) was present along with 34 percent 1,4-hexadiene, 35–36 percent 3-methyl-heptadiene and 18–19 percent 3-ethyl-1,4-hexadiene and 2 percent $C_R$-dienes in the products. The first run also gave 12 percent cyclic homodimers of butadiene and heavy oligomers whereas the second run gave only 5 percent. The respective conversions of runs one through three were 56 percent, 19 percent and 38 percent.

I claim:

1. A process for the preparation of 1,4-dienes by the interaction of a monoolefinic hydrocarbon with a conjugated diolefinic hydrocarbon which comprises contacting a monoolefinic hydrocarbon and a conjugated diolefinic hydrocarbon with a solid phase catalyst composition comprising a complex of (a) nickel, (b) an electron donor ligand of hydrocarbon substituted elements of Group V-A of the Periodic Table selected from the group consisting of a monotertiary phosphine, a ditertiary phosphine, a monotertiary arsine, a ditertiary arsine, a monotertiary stibine, a ditertiary stibine, a monotertiary bismuthine and a ditertiary bismuthine, and (c) a non-protonic Lewis acid, capable of forming a coordination bond with nickel, and a reducing agent capable of reducing nickel acetylacetone to an oxidation state of less than two, on a solid, acidic silica-based support, said support containing a minor amount of nickel represented by (a), said (c) being combined with (a) to reduce nickel (a) to an oxidation state of less than two and to form a coordination bond with nickel (a), said components being combined in a mole ratio of (b) to (a) of about 1.0 to 20:1, a mole ratio of (c) to (a) of at least about 3:1, provided that component (c), is in excess of component (b), and that components (a), (b) and (c) are present in a mole ratio which provide a solid, black amorphous complex fixed on the solid acidic silica based support.

2. The process of claim 1 wherein said nickel is about 0.1 to 15 weight percent, based on said support, the mole ratio of (b) to (a) is about 1 to 10:1, and the mole ratio of (c) to (a) is about 5 to 20:1.

3. The process of claim 2 wherein said electron donor ligand (b) is a phosphine of the formula $$R_3P$$

wherein R is hydrocarbon of 1 to about 20 carbon atoms.

4. The process of claim 3 wherein (a) is nickel acetylacetonate.

5. The process of claim 4 wherein said phosphine is tri-n-butylphosphine.

6. The process of claim 4 wherein said phosphine is triphenylphosphine.

7. The process of claim 3 wherein said Lewis acid and said reducing agent is an aluminum alkyl halide.

8. The procsss of claim 7 wherein said Lewis acid an said reducing agent is ethylaluminum sesquichloride.

9. The process of claim 8 wherein said phosphine is tri-n-butylphosphine or triphenylphosphine.

10. The process of claim 1 wherein the support is silica-alumina.

11. The process of claim 10 wherein the support is comprised of about 45 to 95 weight percent amorphous silica-alumina, and about 5 to 55 weight percent alumina, the total alumina content of said support being about 20 to 70 weight percent.

12. The process of claim 11 wherein said alumina is selected from the group consisting of amorphous hydrous alumina, alumina monohydrate and mixtures thereof.

13. The process of claim 2 wherein the support is comprised of about 45 to 95 weight percent amorphous silica-alumina, and about 5 to 55 weight percent alumina, the total alumina content of said support being about 20 to 70 weight percent.

14. The process of claim 3 wherein the support is comprised of about 45 to 95 weight percent alumina, the total alumina, and about 5 to 55 weight percent alumina, the total alumina content of said support being about 20 to 70 weight percent.

15. The process of claim 7 wherein the support is comprised of about 45 to 95 weight percent amorphous silica-alumina, and about 5 to 55 weight percent alumina, the total alumina content of said support being about 20 to 70 weight percent.

16. The process of claim 8 wherein the support is comprised of about 45 to 95 weight percent amorphous silica-alumina, and about 5 to 55 weight percent alumina, the total alumina content of said support being about 20 to 70 weight percent.

17. The process of claim 9 wherein the support is comprised of about 45 to 95 weight percent amorphous silica-alumina, and about 5 to 55 weight percent alumina, the total alumina content of said support being about 20 to 70 weight percent.

18. The process of claim 13 wherein said alumina is selected from the group consisting of amorphous hydrous alumina, alumina monohydrate and mixtures thereof.

19. The process of claim 15 wherein said alumina is selected from the group consisting of amorphous hydrous alumina, alumina monohydrate and mixtures thereof.

20. The process of claim 16 wherein said alumina is selected from the group consisting of amorphous hydrous alumina, alumina monohydrate and mixtures thereof.

21. The process of claim 17 wherein said alumina is selected from the group consisting of amorphous hydrous alumina, alumina monohydrate and mixtures thereof.

* * * * *

PO-1050
(5/69)

UNITED STATES PATENT OFFICE
CERTIFICATE OF CORRECTION

Patent No. 3,679,772         Dated July 25, 1972

Inventor(s)  Jin S. Yoo

It is certified that error appears in the above-identified patent and that said Letters Patent are hereby corrected as shown below:

Column 9, line 66; delete the word "acetylacetone" and insert in place thereof --- acetylacetonate---

Column 10, line 43; delete the phrase "alumina, the total alumina" and insert in place thereof the phrase --- amorphous silica-alumina,---

Signed and sealed this 2nd day of January 1973.

(SEAL)
Attest:

EDWARD M. FLETCHER, JR.
Attesting Officer

ROBERT GOTTSCHALK
Commissioner of Patents